United States Patent [19]

Agarwal et al.

[11] Patent Number: 4,536,310

[45] Date of Patent: Aug. 20, 1985

[54] HYDROCARBON BASED GELS AND SOLUTIONS OF BLENDS OF SULFONATE IONOMERS AND THEIR PRECURSORS EXTENDED OVER CRITICAL REGIONS

[75] Inventors: Pawan K. Agarwal, Westfield; Robert D. Lundberg, Bridgewater; William W. Graessley, Annandale; Gay Ver Strate, Matawan, all of N.J.

[73] Assignee: Exxon Research and Engineering Co., Florham Park, N.J.

[21] Appl. No.: 565,157

[22] Filed: Dec. 23, 1983

[51] Int. Cl.³ .......................... C10M 5/10; C10M 5/22
[52] U.S. Cl. ..................................................... 252/33
[58] Field of Search ............................................ 252/33

[56] References Cited

U.S. PATENT DOCUMENTS 4,372,862  2/1983  Miller .................................... 252/33
4,382,005  5/1983  Miller .................................... 252/33

Primary Examiner—Jacqueline V. Howard
Attorney, Agent, or Firm—Richard E. Nanfeldt

[57] ABSTRACT

The present invention relates to hydrocarbon extended gels and solutions of blends of sulfonated ionomers and their precursors which behave as rigid gels at high shear rates, but act as viscous liquids at very low shear rates. The blend gel systems have more persistent networks than the gels of sulfonated ionomers. Typically the blends containing 5 to 25 times their weight in oil are preferred compositions.

5 Claims, 4 Drawing Figures

HYDROCARBON BASED GELS AND SOLUTIONS OF BLENDS OF SULFONATE IONOMERS AND THEIR PRECURSORS EXTENDED OVER CRITICAL REGIONS

FIELD OF THE INVENTION

The present invention relates to hydrocarbon extended gels and solutions of blends of sulfonated ionomers and their precursors which behave as rigid gels at high shear rates, but act as viscous liquids at very low shear rates. The blend gel systems have more persistent networks than the gels of sulfonated ionomers. Typically the blends containing 5 to 25 times their weight in oil are preferred compositions.

BACKGROUND OF THE INVENTION

Sulfonated ionomers, specifically sulfonated EPDM and lightly sulfonated polystyrene are materials that have been disclosed in previously filed U.S. patent applications and issued U.S. patents. When sulfonated to levels of about 1 mole percent (that is, from 10 milliequivalents per 100 grams of polymer up to 50 milliequivalent per 100 grams of polymer), these materials display a strong ionic crosslinking. The manifestations of this strong ionic crosslinking are that the elastomers appear to be covalently crosslinked, but in fact can be dissolved in suitable solvent systems. The instant invention differs from the above systems in that, it describes the sulfonated ionomers in blends with unsulfonated polymers which are extended by suitable solvents or oils to yield systems which are not dilute solutions, and which display very high viscosities and simultaneously display a high degree of creep behavior.

Several applications and issued patents which have described the dilute solution behavior of sulfonated ionomers disclose how sulfonation can be employed to critically control the viscosity of both lubricated compositions and organic fluids. Similarly the use of sulfonated EPDM in oil extended formulations containing up to 100 or 150 parts of oil per 100 of elastomer are well known and are described in several U.S. applications. The use of sulfonated EPDM in asphalt compositions have also previously been described. The blend compositions of sulfonated and unsulfonated polymers in their bulk state has been disclosed in previous U.S. applications, but none of these aforementioned applications are relevant to the instant invention. The instant invention teaches highly extended hydrocarbon oil blends of sulfonated ionomers and their unsulfonated counterparts which display unusual viscoelastic behavior summarized as follows: (a) at high strain rates the material behaves as if it were covalently crosslinked, (b) at very low strain rates behaves as if it were a simple viscous fluid, and (c) at comparable concentrations the blends have a more persistent network than the sulfonated ionomer gels alone or the solutions of unsulfonated polymers.

The compositions described in this invention, therefore, differ from previous disclosures in U.S. patent applications and issued U.S. patents for the reasons that previous disclosures such as those dealing with oil extended rubber claimed a very high degree of ionic crosslinking and a very low extension with a suitable fluid; for example, in sulfonated EPDM systems extension with oil up to 150 parts per hundred of polymer were widely disclosed and claimed. This invention differs from that previously described compositions in that (i) the levels of oil typically employed with sulfonated EPDM in the instant invention are nearly an order of magnitude higher and (ii) the present invention deals with a blend system of sulfonated and unsulfonated polymer. Accordingly, in the present invention over all there is a much lower level of ionic crosslinking which is an integral part of the instant invention. Previous disclosures have also described very dilute solutions in oil of sulfonated ionomers. Such cases are different from the present because (i) in these cases most often a polar cosolvent was used and (ii) the systems were normally true solutions, i.e., being Newtonian in nature. Other disclosures based on the blends of sulfonated and unsulfonated polymers are different because (i) such blends were prepared in true bulk state with the aim of using them in their bulk state and (ii) the blending of the polymers was done using a typical plastic processing unit such as the mill roll, extruder, etc.

The compositions of this invention are neither of the above in that the composition of the instant invention displays a high degree of ionic association or entanglement when stressed at rapid rates, but yet which, when subjected to stress over long periods of time, will slowly creep and flow. This behavior is often observed with very high molecular weight polymer materials having certain types of relaxation times. Usually high molecular weight polymers that exhibit such behavior are in their bulk state, however, the composition of this invention appears to differ significantly from conventional polymeric materials in the scope and perspective of the relaxation times involved.

SUMMARY OF THE INVENTION

The present invention relates to solutions or gels of a blend of a major portion of a sulfonated polymer and a minor portion of an unsulfonated polymer in a hydrocarbon solution, wherein the sulfonated polymer is a sulfonated thermoplastic or elastomer such as sulfonated polystyrene or sulfonated EPDM terpolymer and the unsulfonated polymer is either a thermoplastic or an elastomer such as polystyrene or EPDM terpolymer.

These gel compositions of the instant invention can be used as grouting or sealing candidates. One limitation of such gels is that they can manifest an undesirable long term creep behavior. Various chemical approaches have been considered to circumvent this problem. The present invention clearly shows such gels can be improved in this respect by incorporating low levels of an unfunctionalized polymer.

A second potential use for this invention relates to hydrocarbon viscosifiers. The extension of the rubbery plateau observed as a consequence of the addition of the unsulfonated polymer to the sulfonated ionomer indicates that an increase in solution viscosity would be observed over selected concentration regimes of the two component polymers. As a consequence this combination of two components should provide more potent viscosification of hydrocarbon diluents such as lubricating oils. Consequently, improved control of hydrocarbon (or oil) rheology should now be feasible over the use of either single component individually.

Finally, a potential application of this phenomenon should also be observed in polymer modified asphalts. The use of sulfonated EPDM as a polymer modifier has been previously shown to improve the low temperature properties and creep resistance of asphalt substantially. Nevertheless, there is a continuing need for improvement creep resistance of such polymer modified systems, especially at mildly elevated temperatures. The viscoelastic behavior of the multi-component polymers of this invention should be directly translatable to sulfonated ionomer-modified asphalts, wherein such systems would exhibit improved creep resistance at high temperature (70° to 100° C.) due to the presence of minor amounts of an unsulfonated ethylene propylene copolymer or terpolymer. Such an improvement would have important technological consequences.

GENERAL DESCRIPTION OF THE INVENTION

It has been discovered that the viscosity of hydrocarbon liquids may be conveniently controlled by incorporating in said hydrocarbon liquid a minor amount of a polymer blend of a sulfonated polymer and an unsulfonated polymer. The sulfonated polymer is characterized as having polymer backbones which are substantially soluble in the organic liquid, and pendant sulfonate groups which are substantially insoluble in the organic liquid.

The number of sulfonate groups contained in the sulfonated polymer is a critical parameter affecting this invention. The number of sulfonate groups present in the polymer can be described in a variety of ways such as weight percent, mole percent, number per polymer chain, etc. For most polymer systems of interest in this invention, it is desirable to employ mole percent. For vinyl homopolymers, such as polystyrene, the sulfonated analog having a sulfonate content of 1.0 mole percent means that one out of every 100 monomer repeat units in the polymer chain is sulfonated. In the case of copolymers, the same definition applies, except for the purposes of this calculation, the polymer can be considered to be prepared from a hypothetical monomer having an average molecular weight, which is the average of the two monomer components. Similarly for terpolymers, the same averaging concepts apply; however, three components are involved. For example, ethylene-propylene-ethylidene norbornene (ENB) is a preferred polymer backbone for this invention. A representative terpolymer would have a composition (weight percent) of 50% ethylene, 45% propylene and 5% ENB. This composition has an average repeat unit molecular weight of about 35. Thus, sulfonation of this composition, which occurs at the unsaturation of the ENB units to a level of 1.0 mole %, which means that in 38.90 gms (1 mole of average monomer repeat units) of this polymer, there would be present 0.01 mole of sulfonic acid groups. An alternate way of expressing this is to state the sulfonate level in terms of milliequivalents of sulfonic acid groups per 100 gms of polymer or meq. per 100 g. of polymer. This latter procedure provides a rapid and independent measure of sulfonic acid content in a polymer through simple titration.

Both mole percent sulfonate and milliequivalent of sulfonate will be employed to describe the sulfonate polymers employed in this invention.

In general, the sulfonated polymer will comprise from about 5 meq. up to 50 meq. of sulfonate groups per 100 g. of polymer, more preferably about 10 meq. to about 40 meq. of pendant sulfonate groups per 100 g. of polymer. Sulfonated polymers which are subject to the process of the instant invention are not limited and include both plastic and elastomeric polymers. Specific polymers include sulfonated polystyrene, sulfonated t-butly styrene, sulfonated polyethylene, sulfonated polypropylene, sulfonated styrene/acrylonitrile copolymers, sulfonated styrene/methyl methacrylate copolymers, sulfonated block copolymers with styrene, sulfonated polyisobutylene, sulfonated ethylenepropylene terpolymers, sulfonated polyisoprene, and sulfonated elastomers and their copolymers such as isoprene-styrene sulfonate copolymer or styrene/butadiene/metal styrene sulfonate terpolymers formed by a free radical copolymerization process.

The unsulfonated polymers of the instant invention are the unsulfonated precursors of the aforementioned sulfonated polymers.

The sulfonated polymers of the instant invention may vary in number average molecular weight from 1,000 to 10,000,000, preferably 5,000 to 500,000, most preferably from 10,000 to 200,000. These polymers may be prepared by methods known in the art; for example, see U.S. Pat. No. 3,642,728, hereby incorporated by reference.

Neutralization of the cited sulfonated polymers with appropriate metal hydroxides, metal acetates, metal oxides, etc. can be conducted by means well-known in the art. For example, the sulfonation process as with Butyl rubber containing a small 0.3 to 1.0 mole % unsaturation, can be conducted in a suitable solvent such as toluene with acetyl sulfate as the sulfonating agent. The resulting sulfonic acid derivative can then be neutralized with a number of different neutralization agents such as sodium phenolate and similar metal salts. The amounts of such neutralization agents employed will normally be stoichiometrically equal to the amount of free acid in the polymer plus any unreacted reagent which still is present. It is preferred that the amount of neutralizing agent be equal to the molar amount of sulfonating agent originally employed plus 10% more to ensure full neutralization. The use of more of such neutralization agent is not critical. Sufficient neutralization agent is necessary to effect at least 50% neutralization of the sulfonic acid groups present in the polymer, preferably at least 90%, and most preferably essentially complete neutralization of such acid groups should be effected. The degree of neutralization of said ionomeric groups may vary from 50 to 500 mole %, preferably 90 to 200%. Most preferably, it is preferred that the degree of neutralization be substantially complete, that is, with no substantial free acid present and without substantial excess of the base other than that needed to ensure neutralization. Thus, it is clear that the polymers which are utilized in the instant invention comprise substantially neutralized pendant groups and, in fact, an excess of the neutralizing material may be utilized without defeating the objects of the instant invention. The neutralized sulfonate groups contain a counterion selected from the groups consisting of iron, antimony, lead and Groups 1A, 1B, 11A and 11B of the Periodic Table of Elements.

It is evident that the unsulfonated and sulfonated polymers covered within this invention encompass a broad class of hydrocarbon polymer systems. It is important that these hydrocarbon polymer backbones of the unsulfonated and sulfonated polymers (in the absence of the sulfonate groups) be soluble in the organic liquid, whose viscosity is to be controlled. To achieve the desired solubility, it is required that the polymer to be employed possess a degree of polarity consistent with that solvent. This solubility relationship can be readily established by anyone skilled in the art simply by using appropriate texts (e.g., Polymer Handbook, edited by Brandrup and Immergut, Interscience Publishers, 1967, section IV-341). In the absence of appropriate polymer solvent compatibility knowledge, this can be determined experimentally by observing whether the selected polymer will be soluble in the solvent at a level of 1 gm polymer per 100 ml solvent. If the polymer is soluble, then this demonstrates that it is an appropriate backbone for modification with sulfonate groups to achieve the objectives of this invention. It is also apparent that polymers which are too polar will not be soluble in the relatively nonpolar organic liquids of this invention. Therefore, only those polymer backbones (i.e., as measured in the absence of ionic groups) having a solubility parameter less than about 10.5 are suitable in this invention. This precludes the use of such polymers as polyvinyl alcohol, polyacrylonitrile, etc. Also highly crystalline polymers are to be avoided since they tend not to be readily soluble in the relatively nonpolar organic liquids employed herein. Therefore, acceptable polymers employed in this invention must possess a level of crystallinity of less than 25%. Thus, these acceptable polymers can be considered substantially noncrystalline.

The preferred unsulfonated and sulfonated EPDM terpolymers for use in the instant invention are prepared by sulfonation of an EPDM-containing ethylidene norbornene units. Other specific examples of preferred ionomeric polymers which are useful in the instant invention include sulfonated polystyrene, sulfonated poly-t-butyl styrene, sulfonated polyethylene, (substantially non-crystalline) and sulfonated polyethylene copolymers, sulfonated polypropylene (substantially non-crystalline), and sulfonated polypropylene copolymers, sulfonated styrenemethyl methacrylate copolymers, (styrene) acrylic acid copolymers, sulfonated polyisobutylene, sulfonated ethylene-propylene terpolymers, sulfonated polyisoprene, sulfonated polyvinyl toluene, sulfonated polyvinyl toluene copolymers and isoprene-styrene sulfonate copolymers formed by a free radical copolymerization process.

The EPDM terpolymers are low unsaturated polymers having about 1 to about 10.0 wt.% olefinic unsaturation, more preferably about 2 to about 8, most preferably about 3 to 7 defined according to the definition as found in ASTM-D-1418-64, and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 75 wt. % ethylene and about 1 to about 10 wt. % of a diene monomer, the balance of the polymer being propylene. Preferably, the polymer contains about 45 to about 70 wt. % ethylene, e.g., 50 wt. % and about 2.6 to about 8.0 wt. % diene monomer, e.g. 5.0 wt. %. The diene monomer is preferably a nonconjugated diene. Illustrative of these nonconjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.), a terpolymer having a Mooney viscosity (ML, 1+8, 212° F.) of about 40 and having an ethylene content of about 50 wt. % and a 5-ethylidene-2-norbornene content of about 5.0 wt. %. The $\overline{M}_n$ of Vistalon 2504 is about 47,000, the $\overline{M}_v$ (in decalin) is about 145,000 and the $\overline{M}_w$ is about 174,000.

Another EPDM terpolymer Vistalon 2504-20 is derived from Vistalon 2504 (Exxon Chemical CO.) by a controlled extrusion process, wherein the resultant Mooney viscosity at 212° F. is about 20. The $\overline{M}_n$ of Vistalon 2504-20 is about 26,000, the $\overline{M}_v$ is about 90,000 and the $\overline{M}_w$ is about 125,000.

Nordel 1320 (DuPont) is another terpolymer having a Mooney viscosity at 212° F. of about 25 and having about 53 wt. % of ethylene, about 3.5 wt. % of 1,4-hexadiene, and about 43.5 wt. % of propylene.

The EPDN terpolymers of this invention have a number average molecular weight ($\overline{M}_n$) of about 10,000 to about 200,000, more preferably of about 15,000 to about 100,000, most preferably of about 20,000 to about 70,000. The Mooney viscosity (ML, 1+8, 212° F.) of the EPDM terpolymer is about 5 to about 60, more preferably about 7 to about 50, most preferably about 10 to about 40. The $\overline{M}_v$ of the EPDM terpolymer is preferably below about 350,000 and more preferably below about 300,000. The $\overline{M}_2$ of the EPDM terpolymer is preferably below about 500,000 and more preferably below about 350,000.

Suitable polystyrene polymers useful in forming the sulfonated polystyrene polymers have an $\overline{M}_n$ of about 10,000 to about 500,000 more preferably about 20,000 to about 200,000 and most preferably about 50,000 to about 200,000.

The ionomeric polymers of the instant invention may be neutralized prior to incorporation into the organic solvent, or by neutralization of the acid form in situ. For example, preferably the acid derivative is neutralized immediately after preparation. For example, if the sulfonation of polystyrene is conducted in solution, then the neutralization of that acid derivative can be conducted immediately following the sulfonation procedure. The neutralized polymer may then be isolated by means well-known to those skilled in the art; i.e., coagulation, steam stripping, or solvent evaporation, because the neutralized polymer has sufficient thermal stability to be dried for employment at a later time in the process of the instant invention. It is well-known that the unneutralized sulfonic acid derivatives do not possess good thermal stability and the above operations avoid that problem.

The blend of the unsulfonated sulfonated polymer such as EPDM terpolymer and sulfonated EPDM terpolymer contains about 0.1 to about 35 wt. % of the unsulfonated polymer, more preferably about 0.2 to about 20 and most preferably about 0.5 to about 20. The concentration of the blend of the unsulfonated polymer and sulfonated polymer in the hydrocarbon liquid is about 1 to about 25 grams of the blend of the unsulfonated and sulfonated polymers per 100 milliters of the hydrocarbon liquid, more preferably about 1 to about 15, and most preferably about 2 to about 20, wherein the organic liquid which has a solubility parameter of less than 9.5 and a viscosity of less than about 100 centipoises and is selected from the group consisting of mineral oil, synthetic oil, lubricating oils, alkanes, cycloalkanes and aromatics and mixtures thereof.

DESCRIPTION OF THE PREFERRED EMBODIMENTS

The following are preferred embodiments of the instant invention.

EXAMPLE 1

Viscoelastic Behavior of 5% Solution of Sulfonated EPDM (20 Meq.) in 100N Oil

A sulfonated ethylene propylene terpolymer (designated TP-319) is prepared using acetyl sulfate as the sulfonating agent and neutralizing with zinc acetate to form a sulfonated EPDM containing roughly 20 milliequivalents of zinc sulfonate per 100 grams of polymer. A relatively non-crystalline EPDM backbone having ethylidene norbornene as the diene monomer was employed during the sulfonation process. The resulting polymer was recovered and dried using procedures described in other patent applications. Five grams of the polymer described above were dissolved in 100 gms of 100N oil. A very viscous mass was formed when stirred with a magnetic stirrer. After about three days, the entire volume was a solid gel which appeared tough and elastic. When the gel was deformed, it was observed to regain an equilibrium shape after several hours. When a small sample was placed as a lump in a glass container, it was observed to flow and fill the container as much as a viscous liquid would, but it took hours to equilibrate with this system.

Figure 1:
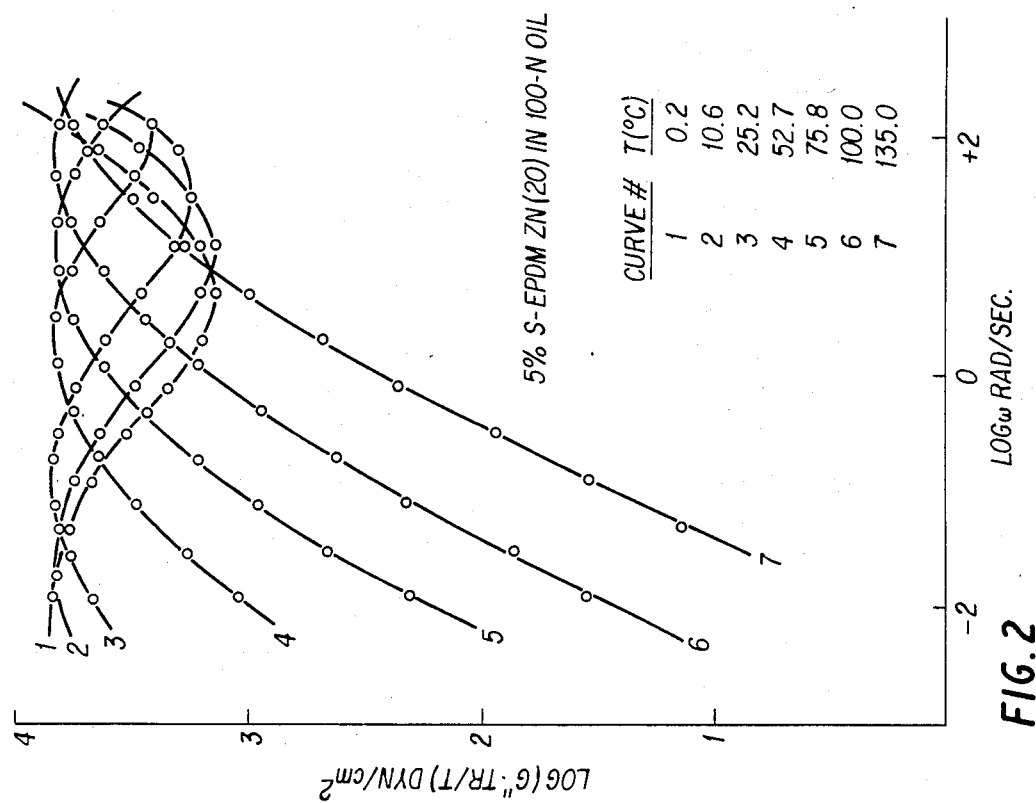
FIG. 1 illustrates isothermal measurements for in-phase modules of a S-ERDMZN in 100N oil.
Figure 2:
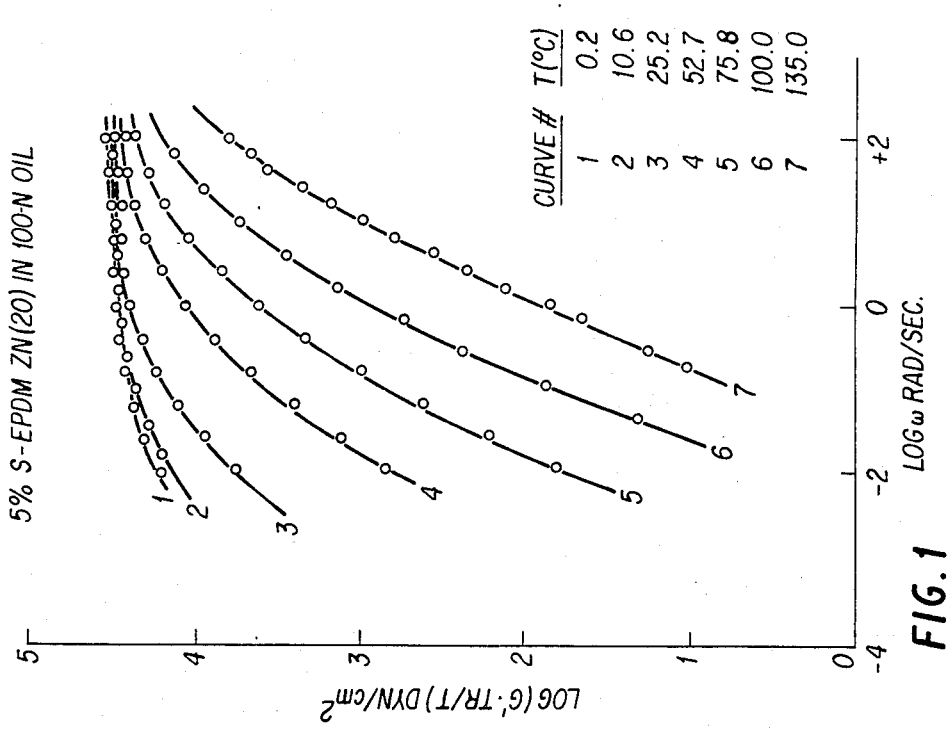
FIG. 2 illustrates isothermal measurement for out of phase modules of a S-EPDMZN in 100N oil.

The dynamic viscoelastic properties of 5% TP-319 in 100N oil were measured using the rheometrics mechanical spectrometer Model No. RMS-7200. The sample in its gel state was tested using a parallel plate geometry. A series of isothermal measurements in the frequency range from 0.002 Hz to 20 Hz at various temperatures were made. Typical data of the inphase modulus G' and out-of-phase modulus G" are shown in FIGS. 1 and 2, respectively. The main results of these data can be summarized as follows: (i) From curve I of FIG. 1 it is clear that in the frequency range of about 1 millihertz to more than 20 hertz the sample has a very flat rubbery plateau indicating the existence of a crosslinked network-like structure that persists up to more than 3 orders of magnitude in the time scale. The value of the equilibrium modulus is about $6.92 \times 10^4$ dyn/cm$^2$. (ii) From the shape and position of various curves presented in FIGS. 1 and 2 it is observed that the time-temperature superposition principle is applicable. This suggests that a master curve representing the behavior of the sample from its solid grassy state to fluid state can be obtained. It is widely known that these kinds of curves are extremely useful for various engineering applications. A process engineer or a technologist relies heavily upon the behavior of polymeric material predicted by their master curves under varying conditions of stresses, time, and temperatures. The curves are presented in the figures, although, do not represent completely the master curve of the system, but nevertheless they present a significant component of the whole curve. Those skilled in the art can easily make various calculations using the widely established mathematical equations for linear viscoelasticity. (iii) From the data taken at high temperatures to form the curves 3, 4, and 5 and keeping in mind that the time temperature equivalence principle is followed by this gel system, at very low frequencies, say at about 0.2 millihertz near ambient temperatures the sample flos perceptibly. In simpler words the sample at room temperature appears to be a stable gel, but in fact it starts to flow in about 15 minutes under no force field other than gravity.

EXAMPLE 2

Viscoelastic Behavior of Solution Blends of S-EPDM and EPDM Polymers

In this series of experiments, various blends incorporating sulfonated EPDM (20 meq.) used in the previous example with the particle EPDM mentioned also in the previous example were made in the manner described previously. The concentration of the major component S-EPDM was kept constant of about 5% as in the previous example. Blends incorporating the 5 gms of Sulfo-EPDM (20 meq.) and varying amounts of the unsulfonated precursor EPDM in 100 gms of 100N oil were prepared. The concentration of the unsulfonated EPDM varied from about 0.1 gms to about 1 gm/100 g, 100N oil. A total of four blends of the following compositions were prepared.

Composition of Blends of S-EPDM and EPDM in 100N Oil

| Blend No. | Curve Legend (FIGS. 3 & 4) | Amount of Sulfo-EPDM (20 Meq.) | Amount of EPDM | Total Amount of Polymer | Amount of 100N Oil |
|---|---|---|---|---|---|
| A | 0 | 5.00 gms. | 0.00 gm. | 5.00 gms. | 100.00 gms |
| B | 1 | 5.00 gms. | 0.10 gm. | 5.10 gms. | 100.00 gms |
| C | 2 | 5.00 gms. | 0.25 gm. | 5.25 gms. | 100.00 gms |
| D | 3 | 5.00 gms. | 0.50 gm. | 5.50 gms. | 100.00 gms |
| E | 4 | 5.00 gms. | 1.00 gm. | 6.00 gms. | 100.00 gms |

It should be mentioned here that the order in which the two polymers are dissolved is not a critical component of the present invention. However, since it takes excessively long times to dissolve the sulfonated polymers, it is preferred that the unsulfonated polymer be dissolved first and then sulfonated polymer be added in the solution. In this way the homogeneous distribution of the unsulfonated polymer in the final blend system is reasonably assured.

Figure 3:
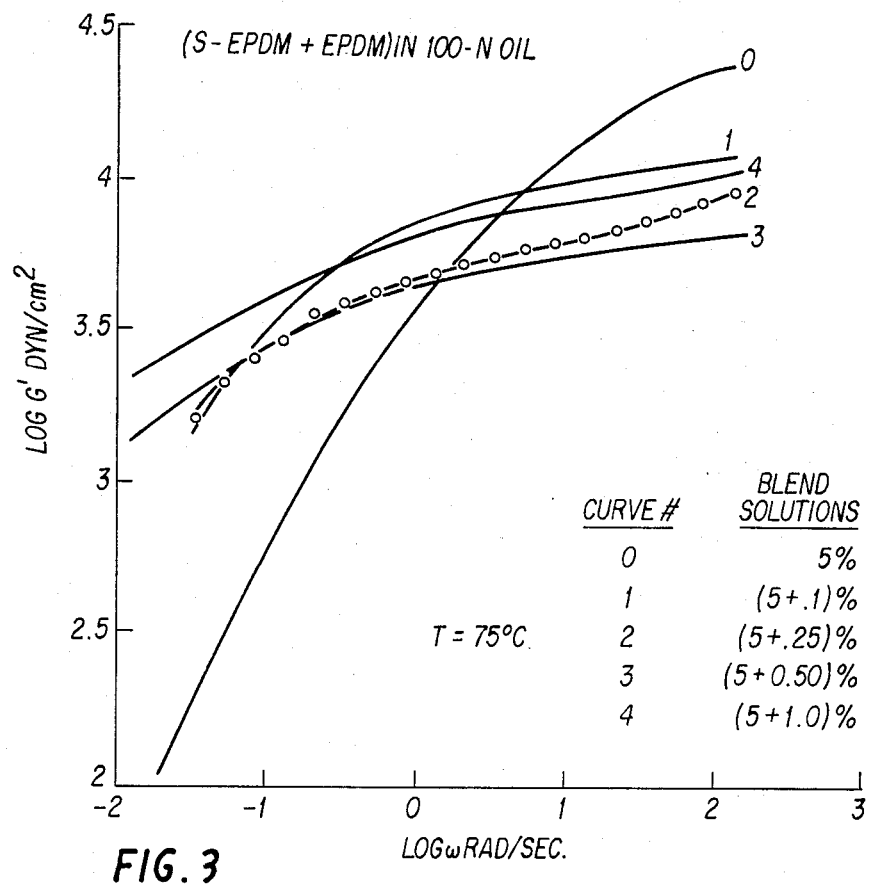
FIG. 3 illustrates isothermal measurements for inphase modules of a mixture of S-EPMZN and EPDM in 100N oil.
Figure 4:
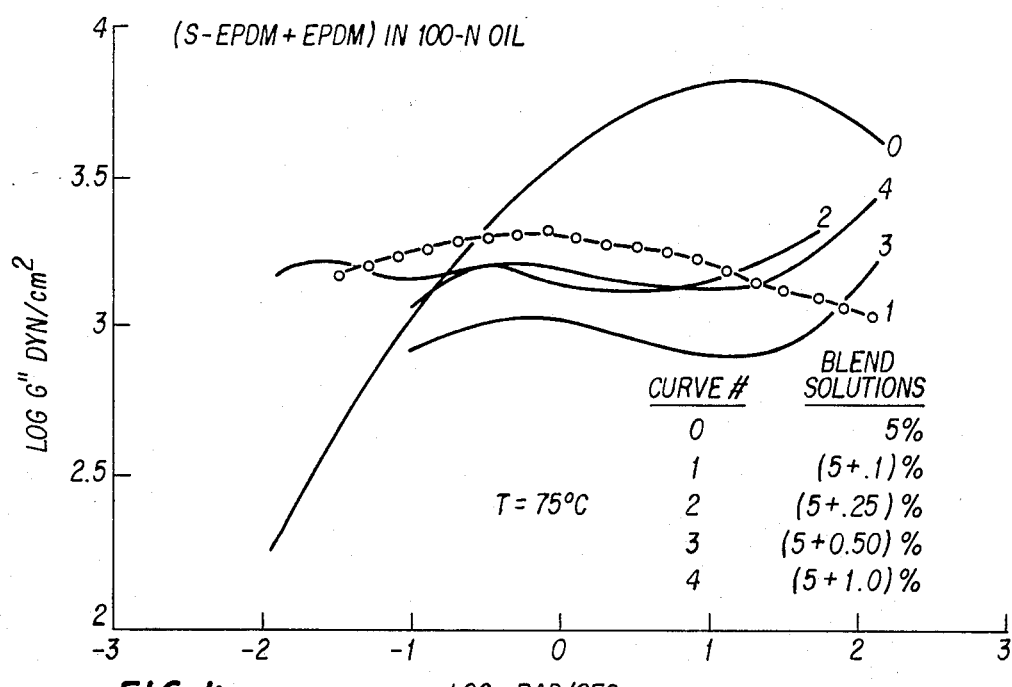
FIG. 4 illustrates isothermal measurement for out of phase modules of a mixture of S-EPDMZN and EPDM.

The viscoelastic measurements on these blends were made in the manner as described in Example 1. Isothermal data of G' and G" versus frequency were measured from near room temperature to about 150° C. For clarity, only data taken at 75° C. are shown in FIGS. 3 and 4. In these figures the curve 0 representing the data of sample 1 is also included for comparison purposes. From the shape and position of the various curves (1 through 4) representing the blends, it is readily observed that the viscoelastic spectrum of the blends is significantly different from that of the 5% solution of S-EPDM (curve 0). It is noted that the incorporation of small amounts of EPDM in the Sulfo-EPDM solution changes the relaxation times of the later dramatically, especially in the low frequency regime. From FIG. 4 it is noted that below about 1 rad/sec frequency S-EPDM sample behaves as Newtonian fluids, while the blend systems do not appear to be anywhere near the viscous flow region. (On a logarithmic plot of G" versus frequency such as FIGS. 2 and 4, the Newtonian viscous flow regime is said to be achieved when the curves have a slope of unity.) From FIG. 3 (recalling that the frequency is inverse of time) it is clear that the increase in the EPDM concentration in the 5% S-EPDM solution shifts the relaxation times of the later to longer times.

The incorporation of EPDM's in the Sulfo-EPDM solution yield systems which have a more persistent network than a system without them. Thus, for example, the blend containing 1 gm of EPDM (Curve 4) have an in-phase modulus, $G'$ (a measure of network strength and persistence), which decreases from $1.2 \times 10^4$ dyn/cm$^2$ to $2.0 \times 10^3$, a factor of about 6 over the frequency span of $1.2 \times 10^2$ rad/sec to $1.2 \times 10^{-2}$, while the in-phase modulus $G'$ of the sample without EPDM (curve 0) (over the same frequency range) decreases from $2.2 \times 10^4$ dyn/cm$^2$ to 50 dyn/cm$^2$, a factor of more than two orders of magnitude (to be exact, a factor of 446). It is not the intent of the inventors to speculate on the mechanism of why such drastic changes in the viscoelastic spectrum occur in the blend system. Nevertheless, it is instructive to point out that perhaps the incorporation of the precursor polymer in the sulfonated polymer changes the friction factor of the sulfonated polymers. Thus, new material compositions exhibiting differing properties are expected to result from the exploitation of this unexpected phenomenon.

EXAMPLE 3

Examples 1, and 2 have demonstrated clearly the differences in the solution blends of S-EPDM and EPDM versus solutions of Sulfo-EPDM alone. The differences were described in terms of their viscoelastic behavior. For those who may not be skilled in the viscoelastic measurements and familiar with the data treatment, the following experiments were carried out to demonstrate the difference in the flow and creep behavior of the said compositions. As mentioned before, most of these samples at room temperature are in the gel form. For each sample small cubes of about 1 cm in size were cut using a scissor or a razor blade and were placed on marked glass plates. In order to determine qualitatively when flow starts to dominate in the samples, still photographs at various time intervals were taken. The smearing of the edges and finally the complete distortion of the sample shape gave a rough estimate of the time when the material starts to flow. It was found that in about 15 to 20 minutes the 5% solution of S-EPDM starts to creep appreciably. The complete distortion of the cube occurs in about 75 minutes as judged from the shape of the cube which turns to flat drop during this period. On the other hand, it was found that the blend samples of S-EPDM and EPDM do not creep to any noticeable degree in the first 2–3 hours and the shape of the samples remains essentially unchanged for this period. Noticeable changes in the sharpness of the edges of the cubes of these samples take place after 3 to 4 hours, and it takes about 6 to 8 hours for these cubes to turn into flat drops.

Based on the above rheological data, it is now possible to define the solution blends of sulfonated ionomers and their precursors of the instant invention. Specifically we claim such blend systems which are hydrocarbon oil extended in which the ionomer ranges from 1.0 parts per 100 parts by weight on oil or hydrocarbon solvent up to 20 parts polymer per 100 parts solvent by weight preferably from 2 to 15 parts polymer/100 solvent, said compositions possessing an inphase modulus ($G'$) of greater than $1 \times 10^2$ dynes/cm$^2$ when measured at a frequency of 1 rad/sec at room temperature, said modulus being less than $1 \times 10^7$ dynes/cm$^2$ when measured under the same conditions.

What is claimed is:

1. A method for controlling the viscosity of hydrocarbon liquids havng a solubility parameter of less than about 9.5 and a viscosity of less than about 100 cps, said hydrocarbon liquid being selected from the group consisting of mineral oil, synthetic oil, lubricating oil, alkanes, cycloalkanes and aromatics and mixtures thereof, which comprises incorporating into said hydrocarbon liquid about 1 to about 15 grams/100 ml of said hydrocarbon liquid of a polymer blend, such polymer blend comprising a metal or amine neutralized sulfonated polymer and an unsulfonated polymer, said unsulfonated polymer comprising about 0.1 to about 35 weight percent of said polymer blend, such neutralized sulfonated polymer and said unsulfonated polymer each having the same polymeric backbone and said unsulfonated polymer being selected from the group consisting of EPDM terpolymers and polystyrene.

2. The method of claim 1 wherein said sulfonated polymer has from about 5 to about 50 meq. pendant sulfonate groups per 100 grams of said sulfonated polymer.

3. The method of claim 1 or 2, wherein said sulfonate groups are neutralized with metal ions selected from groups consisting of antimony, iron, lead and Groups 1A, 1B, 11A and 11B of the Periodic Table of Elements.

4. The method of claims 1 or 2, wherein said hydrocarbon liquid is a lubricating oil.

5. The method according to claim 1, wherein said unsulfonated polymer is about 0.5 to about 20 wt. % of said polymer blend.

* * * * *